(12) United States Patent
Moshchuk et al.

(10) Patent No.: US 9,139,203 B2
(45) Date of Patent: Sep. 22, 2015

(54) LANE TRACKING SYSTEM

(75) Inventors: Nikolai K. Moshchuk, Grosse Pointe, MI (US); Shuqing Zeng, Sterling Heights, MI (US); Xingping Chen, Warren, MI (US); Bakhtiar Brian Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 613 days.

(21) Appl. No.: 13/289,517

(22) Filed: Nov. 4, 2011

(65) Prior Publication Data

US 2013/0116854 A1 May 9, 2013

(51) Int. Cl.
*G06F 19/00* (2011.01)
*B60W 30/12* (2006.01)

(52) U.S. Cl.
CPC .......... *B60W 30/12* (2013.01); *B60W 2420/42* (2013.01)

(58) Field of Classification Search
None
See application file for complete search history.

(56) References Cited

U.S. PATENT DOCUMENTS

| | | | |
|---|---|---|---|
| 5,318,143 A * | 6/1994 | Parker et al. | 180/168 |
| 6,670,910 B2 * | 12/2003 | Delcheccolo et al. | 342/70 |
| 7,216,023 B2 * | 5/2007 | Akita | 701/41 |
| 7,689,321 B2 * | 3/2010 | Karlsson | 700/253 |
| 7,974,748 B2 * | 7/2011 | Goerick et al. | 701/28 |
| 8,213,706 B2 * | 7/2012 | Krishnaswamy et al. | 382/154 |
| 8,229,663 B2 * | 7/2012 | Zeng et al. | 701/301 |
| 8,428,843 B2 * | 4/2013 | Lee et al. | 701/93 |
| 8,473,144 B1 * | 6/2013 | Dolgov et al. | 701/28 |
| 2008/0306687 A1 | 12/2008 | Ryu et al. | |
| 2009/0319113 A1 | 12/2009 | Lee | |
| 2010/0017128 A1 * | 1/2010 | Zeng | 701/301 |
| 2010/0191461 A1 | 7/2010 | Zeng | |
| 2011/0112739 A1 | 5/2011 | O'Dea et al. | |
| 2011/0153266 A1 * | 6/2011 | Shankwitz et al. | 702/150 |
| 2012/0062747 A1 * | 3/2012 | Zeng | 348/149 |
| 2012/0185212 A1 * | 7/2012 | Ekelin | 702/182 |
| 2012/0221168 A1 * | 8/2012 | Zeng et al. | 701/1 |
| 2012/0221244 A1 * | 8/2012 | Georgy et al. | 701/472 |

* cited by examiner

*Primary Examiner* — Redhwan k Mawari
*Assistant Examiner* — Edward Torchinsky
(74) *Attorney, Agent, or Firm* — Quinn Law Group, PLLC

(57) ABSTRACT

A lane tracking system for tracking the position of a vehicle within a lane includes a camera configured to provide a video feed representative of a field of view and a video processor configured to receive the video feed from the camera and to generate latent video-based position data indicative of the position of the vehicle within the lane. The system further includes a vehicle motion sensor configured to generate vehicle motion data indicative of the motion of the vehicle, and a lane tracking processor. The lane tracking processor is configured to receive the video-based position data, updated at a first frequency; receive the sensed vehicle motion data, updated at a second frequency; estimate the position of the vehicle within the lane from the sensed vehicle motion data; and fuse the video-based position data with the estimate of the vehicle position within the lane using a Kalman filter.

7 Claims, 2 Drawing Sheets

LANE TRACKING SYSTEM

TECHNICAL FIELD

The present invention relates generally to systems for enhancing the lane tracking ability of an automobile.

BACKGROUND

Vehicle lane tracking systems may employ visual object recognition to identify bounding lane lines marked on a road. Through these systems, visual processing techniques may estimate a position between the vehicle and the respective lane lines, as well as a heading of the vehicle relative to the lane. Such processing/recognition techniques, however, may be processor intensive and/or may require heavy filtering. This may result in the position estimates being time-delayed relative to the acquisition of the video information. Additionally, visual information may be acquired sporadically due to visual obstructions, ambient visibility limitations, dirt/debris that may cloud the visibility of the camera lens, and/or the need to aggregate multiple sequential frames for certain video filtering methods. Such latency and/or sporadic or slow refresh rates may lead to system instabilities or may compromise the vehicle's response time/accuracy if an automatic path correction is warranted.

SUMMARY

A lane tracking system for tracking the position of a vehicle within a lane includes a camera configured to provide a video feed representative of a field of view and a video processor configured to receive the video feed from the camera and to generate latent video-based position data indicative of the pose (position and heading) of the vehicle within the lane. The system further includes a vehicle motion sensor suite configured to generate vehicle motion data indicative of the motion of the vehicle, and a lane tracking processor.

The lane tracking processor may be configured to receive the video-based position data, updated at a first frequency; receive the sensed vehicle motion data, updated at a second frequency; estimate the position of the vehicle within the lane from the sensed vehicle motion data; and fuse the video-based position data with the estimate of the vehicle position within the lane using an enhanced Kalman filter.

In one configuration, the lane tracking processor may be configured to estimate the position of the vehicle within the lane from the sensed vehicle motion data by incrementally dead reckoning the pose at the second frequency. Likewise the lane tracking processor may be configured to buffer the sensed vehicle motion data for future reference. The sensed vehicle motion data may include, for example, a longitudinal velocity, a lateral velocity, a lateral acceleration, and a yaw rate Upon the receipt of the updated/refreshed video-based position data, the lane tracking processor may be configured to roll back the estimated position of the vehicle within the lane by a predefined number of increments; fuse the updated video-based position data with the estimate of the vehicle position within the lane; update a covariance matrix; and incrementally estimate the position of the vehicle within the lane forward through the predefined number of increments by dead reckoning the position from the buffered sensed vehicle motion data. In one configuration, the predefined number of increments may be proportional to the latency of the video-based position data, and proportional to the second frequency.

Following the fusion of the sensory data, the lane tracking processor may be further configured to control the motion of the vehicle to maintain the vehicle within the center of a lane.

The above features and advantages and other features and advantages of the present invention are readily apparent from the following detailed description of the best modes for carrying out the invention when taken in connection with the accompanying drawings.

DETAILED DESCRIPTION

Figure 1:
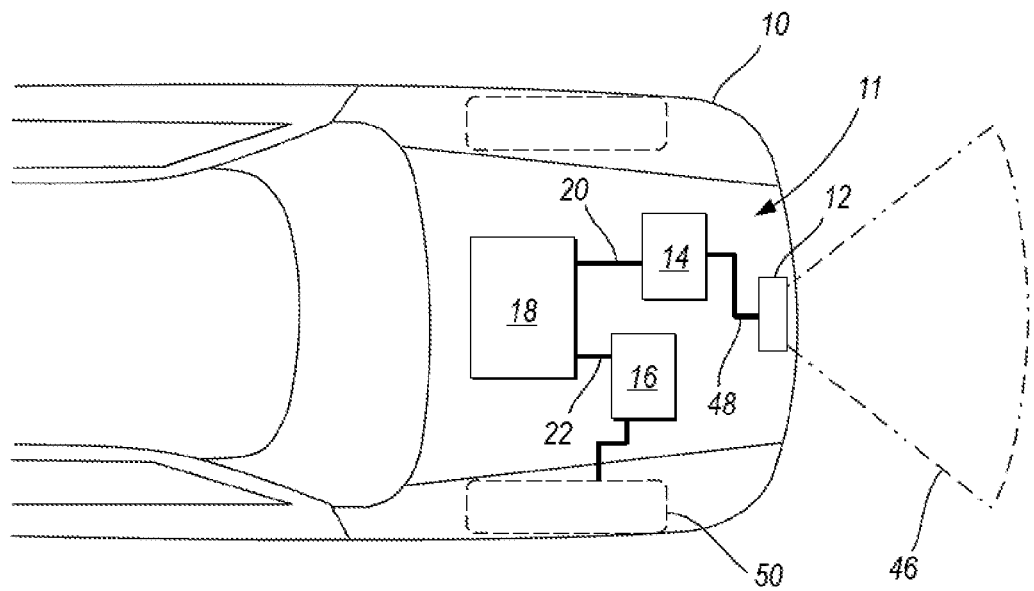
FIG. 1 is a schematic diagram of a vehicle including a lane tracking system.
Figure 2:
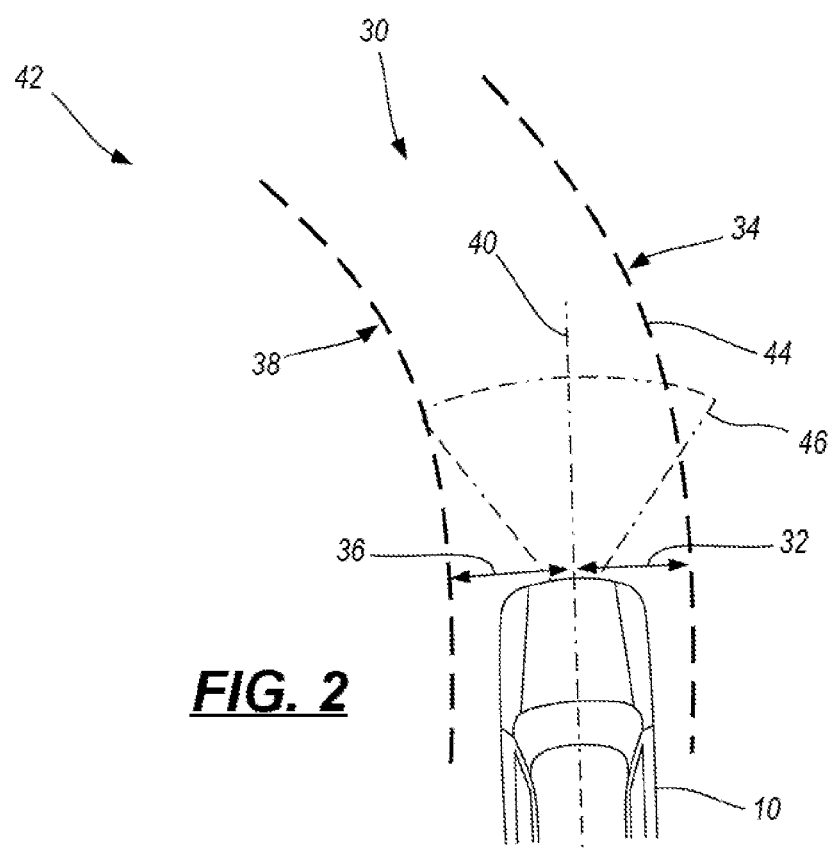
FIG. 2 is a schematic diagram of a vehicle disposed within a lane of a road.

Referring to the drawings, wherein like reference numerals are used to identify like or identical components in the various views, FIG. 1 schematically illustrates a vehicle 10 with a lane tracking system 11 that includes a forward facing camera 12, a video processor 14, a vehicle motion sensor 16, and a lane tracking processor 18. As will be described in greater detail below, the lane tracking processor 18 may fuse video-based position data 20 with sensed vehicle motion data 22 to determine the position of the vehicle 10 within a traffic lane 30 (as generally illustrated in FIG. 2). For example, the lane tracking processor 18 may determine in near-real time, the distance 32 between the vehicle 10 and the right lane line 34, the distance 36 between the vehicle 10 and the left lane line 38, and/or the heading 40 of the vehicle 10 relative to the lane 30.

The video processor 14 and lane tracking processor 18 may each be respectively embodied as one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, power electronics/transformers, and/or signal conditioning and buffering electronics. The individual control/processing routines resident in the processors 14, 18 or readily accessible thereby may be stored in ROM or other suitable tangible memory locations and/or memory devices, and may be automatically executed by associated hardware components of the processors 14, 18 to provide the respective processing functionality. In another configuration, the video processor 14 and lane tracking processor 18 may be embodied by a single device, such as a digital computer or data processing device.

As the vehicle 10 travels along the road 42, one or more forward facing cameras 12 may visually detect markers (e.g., hash 44) that may be painted or embedded on the surface of the road 42 to define the lane 30. The one or more cameras 12 may each respectively include one or more lenses and/or filters adapted to receive and/or shape light from within the field of view 46 onto an image sensor. The image sensor may include, for example, one or more charge-coupled devices (CCDs) configured to convert light energy into a digital signal. The one or more cameras 12 may be positioned in any suitable orientation/alignment with the vehicle 10, provided that they may reasonably view the one or more objects or markers disposed on or along the road 42. In one configuration, the camera 12 may be disposed within the front grille of the vehicle 10. In another configuration, the camera 12 may be disposed within the windshield of the vehicle 10 and oriented in a generally forward-facing direction (e.g., on a forward-facing surface of the rear-view mirror). The camera 12 may output a video feed 48, which may comprise, for example, a plurality of still image frames that are sequentially captured at a fixed rate (i.e., frame rate). In one configuration, the frame rate of the video feed 48 may be greater than 5 Hertz (Hz), however in a more preferable configuration, the frame rate of the video feed 48 may be greater than 10 Hertz (Hz).

The video processor 14 may receive the video feed 48 from the camera 12, and may be configured to identify and/or track one or more objects between the plurality of image frames. Using various image processing techniques, the video processor 14 may identify the location and path of the bounding lane lines 34, 38, and may correspondingly estimate the distances 32 and 36 between the vehicle 10 and the respective lines 34, 38, along with the relative heading 40. The video processor 14 may then output the position estimates to the lane tracking processor 18 as video-based position data 20.

The video-based position data 20 provided to the lane tracking processor 18 may be updated/refreshed on a periodic basis. The refresh-rate of the video-based position data 20 may be dictated by the available bandwidth and processing power of the video processor 14, the frame rate of the camera 12, and/or the filtering algorithms employed. The video-based position data 20 may further have an inherent latency due to the processing complexity of the lane line detection algorithms and/or any needed video filtering (e.g., to smooth and/or enhance images that may appear blurred due to road jounce/harshness). In one configuration, for example, the video-based position data 20 may be refreshed every 100 ms, and may have a latency of about 200 ms.

To enhance the accuracy and update frequency of the video-based position data 20, the lane tracking processor 18 may employ Kalman filtering techniques to combine the video-based position data 20 with incremental positional data that may be estimated from the one or more motion sensors 16 available on the vehicle 10 (e.g. using dead reckoning techniques). The one or more vehicle motion sensor(s) 16 may monitor, for example, the rotational speed and/or steering angle of one or more vehicle wheels 50, the vehicle yaw angle, the lateral and/or longitudinal speed and/or acceleration of the vehicle 10, and/or the magnetic heading of the vehicle 10. This sensed vehicle motion data 22 may be capable of rapid refresh rates, which may augment/refine the latent video-based position data 20, such as illustrated in the sensor fusion method 60 provided in FIG. 3. In one configuration, for example, the sensed vehicle motion data 22 may be refreshed every 10 ms, and may have a negligible latency (i.e., approaching the speed of the processor to deduce positional data).

Figure 3:
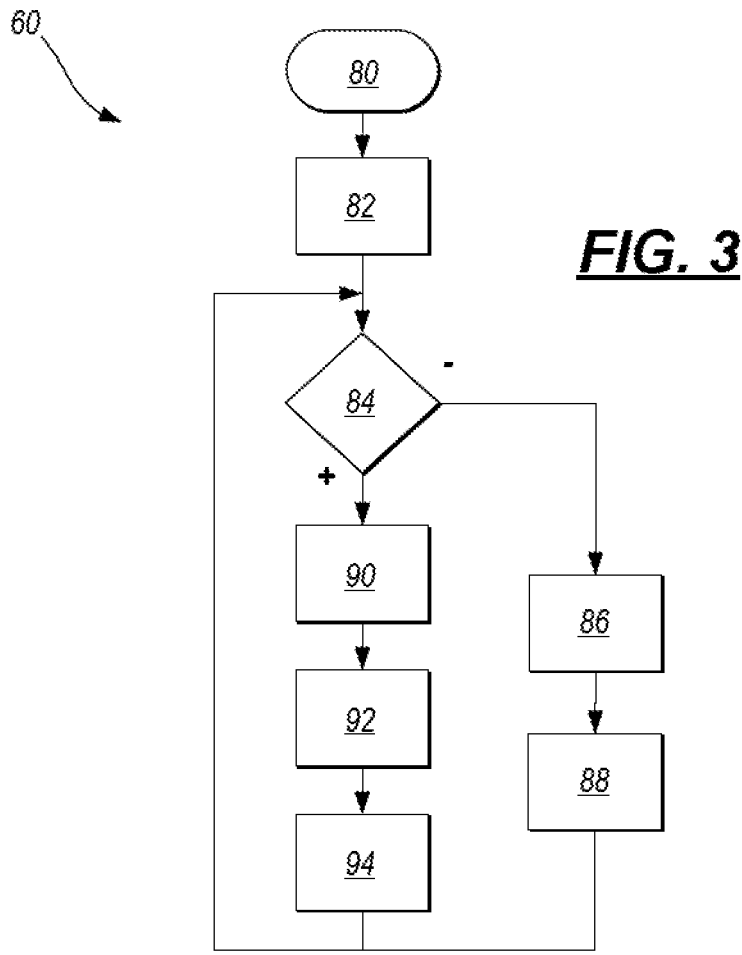
FIG. 3 is a flow diagram of a method of fusing low-frequency, latent video data with high-speed sensed motion data.
Figure 4:
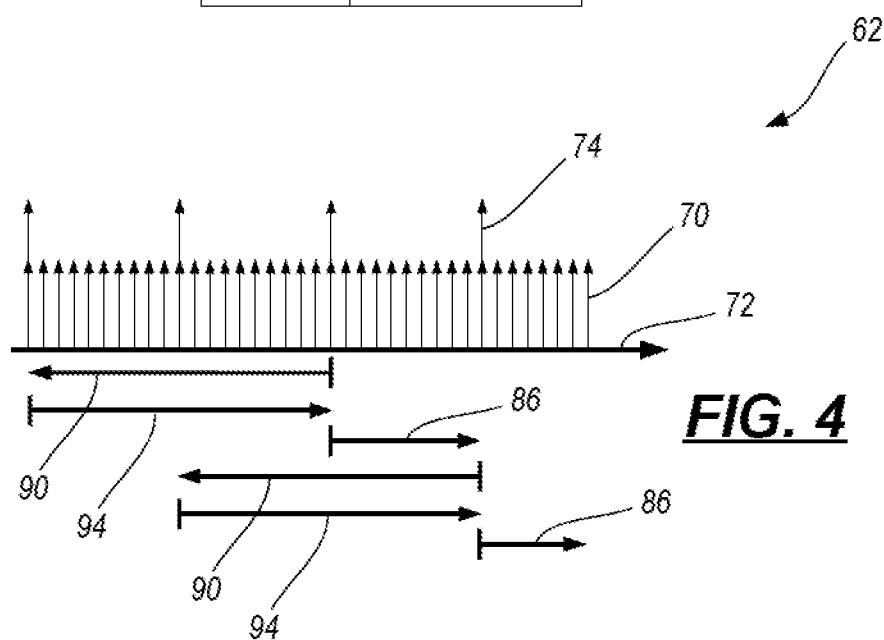
FIG. 4 is a schematic timing diagram generally illustrating the method of FIG. 3.

FIGS. 3 and 4 together illustrate a method 60 of fusing the latent video-based position data 20 with the positional data estimated from the vehicle motion sensors 16. This method 60 may be executed or performed by the lane tracking processor 18 on a continuous basis upon receipt of the video-based position data 20 and the sensed motion data 22. FIG. 4 illustrates a timing diagram 62 according to this sensor fusion method 60, where each small arrow 70 along timeline 72 represents, for example, 10 ms positional data obtained from the vehicle motion sensors 16. Likewise, each large arrow 74 represents 100 ms video-based position data 20 arriving with a 200 ms latency. Referring again to FIG. 3, the method begins at step 80 when the system is energized, which is immediately followed by an initialization step 82. In the initialization step 82, an initial, starting position is obtained as a baseline such as though video-based position data 20.

At step 84, the method 60 then inquires whether new or updated video-based positional data 20 is available. If it is not, then at step 86, the processor 18 will estimate an incremental movement of the vehicle 10 using dead reckoning techniques performed from the 10 ms sensed vehicle motion data 22. In one configuration, these techniques may solve Equations 1-4 to determine a lateral deviation of the vehicle from the lane center ($\Delta y$) and a relative heading angle of the vehicle with respect to lane centerline ($\Delta \psi$) (e.g., the difference between absolute heading of the vehicle and absolute heading of the lane markings).

$$\Delta \dot{y} = V_y + V_x \Delta \psi \qquad \text{Equation 1}$$

$$\Delta \dot{\psi} = r + k(s) V_x \qquad \text{Equation 2}$$

$$\dot{V}_y = \frac{C_f + C_r}{M V_x} V_y - \left(V_x + \frac{C_f a - C_r b}{M V_x}\right) r + \frac{C_f}{M} \delta \qquad \text{Equation 3}$$

$$\dot{r} = \frac{C_f a - C_r b}{I_z V_x} V_y - \frac{a^2 C_f + b^2 C_r}{I_z V_x} r + \frac{a C_f}{I_z} \delta \qquad \text{Equation 4}$$

As used above, $V_x$ is the longitudinal velocity of the vehicle 10; $V_y$ is the lateral velocity of the vehicle 10; r is the sensed yaw rate, $\delta$ is the road wheel angle, a and b are the longitudinal distances from the vehicle center of gravity to the respective front and rear axles; M is the mass of the vehicle 10; $I_z$ is the vehicle yaw inertia; $C_f$ and $C_r$ are the cornering stiffnesses; and k(s) is the curvature of the road as perceived by the video processor 14. In another configuration where $V_y$ is available, then the system may, for example, only be required to solve Equations 1-2. Therefore, as may be appreciated, the number and complexity of the dynamic model may vary depending on the types of sensory motion data available.

While such dead reckoning techniques may provide valuable short-term behavioral insight, particularly because of their fast response rate (i.e., at the speed of the sensory inputs), due to noisy measurements and/or assumptions made in the dynamic equations, the estimated position may drift from the true/actual position over time. In this manner, upon the arrival of new video-based position data 20, Kalman filtering techniques maybe used to fuse the two independent indications of position. For future reference, the sensed motion data 22 may be buffered in step 88.

Referring back to step 84, if the processor 18 sees that new video-based position data 20 is available, in step 90, it may roll back the dead reckoned position computations a number of steps that may be proportional as to the latency and the update speed of the vehicle motion sensors 16 (e.g., 20 steps in the present example). In this manner, the latent video frame may be synchronized in time with the position calculation at the time the video frame was acquired (i.e., prior to any computational latency). In another configuration, the video processor 14 may apply a time-stamp to the video feed 48 as it is received. Then, step 90 may roll-back the incremental dead reckoned position a number of steps that would bring it in line with the video acquisition.

In step 92, the processor 18 may then fuse/update the deduced movement/position with the newly acquired video-based position data 20. Additionally, in step 92, the processor 18 may update the covariance matrix that supervises the sensor fusion. As known in the art, the covariance matrix is used to assign a weighting or "trustworthiness" to particular sensory information during the sensor fusion.

Using the raw sensor values buffered in step 88, together with the newly updated vehicle position information, in step 94, the processor 18 may then re-step forward up to the real-time data, at which time it may continue using the dead reckoning techniques via step 86 until the next video-based position information arrives. If the dead reckoning estimates happen to drift away from the real position, the delayed video-based position measurements would then pull the position estimate back towards the real position in a manner that does not disturb the position data to the point of becoming rapidly changing and/or noisy. This fused position estimate may then be output to other monitoring/control systems on a near real-time basis.

By fusing vehicle sensory information together with video-based position measurements, the overall lane recognition and/or lane centering algorithms may be more robust than using either technology alone. The flexibility of the algorithm, however, may likewise account and/or adjust for missing video frames, or situations where visibility is sporadic or imperfect (either due to atmospheric conditions, or due to a lack of lane marking clarity). In addition, this delayed observation sensor fusion technique may also be modified to account for additional sensory information, such as GPS measurements or RF triangulation—both of which generate latent position information.

In one configuration, the vehicle 10 may use the position measurements generated by the lane tracking processor 18 for one or more control and/or monitoring functions. For example, if the processor 18 detects that the vehicle is approaching the left lane line 38 (i.e., distance 36 is decreasing toward zero), the vehicle 10 may alert the driver. Alternatively, various closed-loop lane centering applications may use the fused position information (i.e., distances 32, 36) to control the motion of the vehicle 10 such that the vehicle 10 may remain positioned in the center of a highway lane with minimal driver involvement (e.g., as may be provided with adaptive cruise control systems). In this manner, the continuous predict/update methodology employed by the Kalman filter may permit smaller, yet more frequent, course corrections than merely relying on latent, sporadic video data.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A lane tracking system for tracking the position of a vehicle within a lane, the system comprising:
   a camera configured to provide a video feed representative of a field of view;
   a video processor configured to receive the video feed and generate latent video-based position data, the video-based position data indicative of the position of the vehicle within the lane;
   a vehicle motion sensor configured to generate vehicle motion data indicative of the motion of a vehicle, wherein the generated latent video-based position data has a greater latency than the generated vehicle motion data; and
   a lane tracking processor configured to maintain a real-time position of the vehicle within the lane using the vehicle motion data and the latent video-based position data, and wherein maintaining the real-time position includes:
   receiving the video-based position data, updated at a first frequency;
   receiving the sensed vehicle motion data, updated at a second frequency that is faster than the first frequency;
   estimating the real-time position of the vehicle within the lane from the sensed vehicle motion data;
   rolling back the real-time position estimate by a predefined number of increments upon receipt of the latent video-based position data;
   fusing the latent video-based position data with the rolled-back estimate of the vehicle position within the lane using Kalman filtering techniques to generate an updated latent vehicle position; and
   recomputing the real-time position estimate using previously received vehicle motion data and the updated latent vehicle position.

2. The lane tracking system of claim 1, wherein the lane tracking processor is configured to estimate the position of the vehicle within the lane from the sensed vehicle motion data by incrementally dead reckoning the position at the second frequency.

3. The lane tracking system of claim 2, wherein the lane tracking processor is configured to buffer the sensed vehicle motion data.

4. The lane tracking system of claim 3, wherein upon the receipt of the updated video-based position data, the lane tracking processor is configured to:
   update a covariance matrix; and
   wherein recomputing the real-time position estimate includes incrementally estimating the position of the vehicle within the lane forward through the predefined number of increments by dead reckoning the position from the buffered sensed vehicle motion data.

5. The lane tracking system of claim 4, wherein the predefined number of increments is proportional to the latency of the video-based position data, and proportional to the second frequency.

6. The lane tracking system of claim 1, wherein the sensed vehicle motion data includes a longitudinal velocity, lateral velocity, and a yaw rate.

7. The lane tracking system of claim 1, wherein the lane tracking processor is further configured to control the motion of the vehicle to maintain the vehicle within the center of a lane.

* * * * *